(12) United States Patent
Kang et al.

(10) Patent No.: US 12,045,329 B2
(45) Date of Patent: Jul. 23, 2024

(54) BIOMETRIC AUTHENTICATION SMART CARDS

(71) Applicant: SAMSUNG ELECTRONICS CO., LTD., Suwon-si (KR)

(72) Inventors: Gi Jin Kang, Seoul (KR); Sung Ung Kwak, Suwon-si (KR); Ji-Soo Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 338 days.

(21) Appl. No.: 17/229,256

(22) Filed: Apr. 13, 2021

(65) Prior Publication Data
US 2021/0397684 A1 Dec. 23, 2021

(30) Foreign Application Priority Data

Jun. 22, 2020 (KR) .......................... 10-2020-0075782
Dec. 9, 2020 (KR) .......................... 10-2020-0171453

(51) Int. Cl.
*G06F 21/32* (2013.01)
*G06F 21/60* (2013.01)

(52) U.S. Cl.
CPC ............ *G06F 21/32* (2013.01); *G06F 21/602* (2013.01)

(58) Field of Classification Search
CPC ................................ G06F 21/32; G06F 21/602
See application file for complete search history.

(56) References Cited

U.S. PATENT DOCUMENTS

| 5,623,552 A | 4/1997 | Lane |
| 10,076,920 B2 | 9/2018 | Mohmedi |
| 2002/0196963 A1* | 12/2002 | Bardwell ................ G06F 18/00 382/126 |
| 2012/0249292 A1* | 10/2012 | Wong .................. H04L 63/0853 340/5.52 |
| 2015/0286922 A1 | 10/2015 | Saito et al. |
| 2019/0044723 A1 | 2/2019 | Prakash et al. |

(Continued)

FOREIGN PATENT DOCUMENTS

| EP | 3461016 A1 | 3/2019 |
| KR | 100827218 | 5/2008 |

(Continued)

OTHER PUBLICATIONS

Communication Pursuant to Article 94(3) EPC for EP 21171605.5 mailed Nov. 15, 2021, 5 pages.

(Continued)

*Primary Examiner* — Alexander Lagor
*Assistant Examiner* — Zoha Piyadehghibi Tafaghodi
(74) *Attorney, Agent, or Firm* — Myers Bigel, P.A.

(57) ABSTRACT

A smart card is provided. The smart card includes a peripheral circuit configured to control a fingerprint sensing array and generate a raw image, an authentication information processing module configured to process the raw image into fingerprint information for verification, a security module configured to determine whether the fingerprint information for verification matches registered fingerprint information to determine usage approval or disapproval for a payment request, and an active shield overlapping the security module. The peripheral circuit, the authentication information processing module, and the security module are integrated into one chip.

19 Claims, 7 Drawing Sheets

(56) References Cited

U.S. PATENT DOCUMENTS

2019/0164156 A1*  5/2019  Lindemann ........... H04L 9/3271
2019/0286805 A1*  9/2019  Law ....................... G06F 21/34
2019/0286868 A1    9/2019  Suwald
2019/0362130 A1* 11/2019  Othman ............. G06V 40/1371

FOREIGN PATENT DOCUMENTS

| KR | 20170003124    | 1/2017 |
| KR | 102014410      | 8/2019 |
| TW | 575560         | 3/2019 |
| WO | 2019161887 A1  | 8/2019 |

OTHER PUBLICATIONS

European Search Report for EP 21171605.5 mailed Nov. 3, 2021, 4 pages.

* cited by examiner

BIOMETRIC AUTHENTICATION SMART CARDS

This application claims priority from Korean Patent Application No. 10-2020-0075782 filed on Jun. 22, 2020, and Korean Patent Application No. 10-2020-0171453 filed on Dec. 9, 2020, in the Korean Intellectual Property Office, the entire disclosures of each of which are incorporated herein by reference.

BACKGROUND

1. Field of the Disclosure

The present disclosure relates to smart cards based on biometric authentication and smart payment systems thereof.

2. Description of the Related Art

When a user purchases items at a store, the user may insert a credit card into a point of sale (POS) terminal of an offline store, and the POS terminal may read payment-related information of the user from the credit card and proceed with the payment for the items. However, it often happens that the payment for the items is carried out even when a non-registered person uses the credit card, and thus a credit card equipped with an authentication means is being developed.

Biometrics is attracting attention as a user authentication technique due to strong security levels thereof and convenient usability. Recently, for user authentication in a commercial product such as a smart phone, a notebook computer, or the like, biometrics that uses biometric information such as a fingerprint, an iris, and facial recognition as a single unit or a combination thereof is used. In addition, biometrics may also be combined with an electronic passport (e-passport) system and used in border control systems in many countries.

As attempts to utilize biometric information as an authentication means increase, interest in a system that performs access control or payment authentication using a means such as a fingerprint or an iris is also increasing. In particular, a system using a fingerprint may be easy to use and may not have much resistance to use on the part of the user, and thus has been relatively widely used.

SUMMARY

Aspects of the present disclosure provide smart cards based on biometric authentication, in which a biometric sensor, an authentication processing module, and a security module are implemented as one chip.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a smart card includes a peripheral circuit configured to control a fingerprint sensing array and generate a raw image, an authentication information processing module configured to process the raw image into fingerprint information for verification, a security module configured to determine whether the fingerprint information for verification matches registered fingerprint information to determine usage approval or disapproval for a payment request, and an active shield overlapping the security module, wherein the peripheral circuit, the authentication information processing module, and the security module are integrated into one chip.

According to another embodiment of the present disclosure, a smart card based on biometric authentication includes a single chip, wherein the single chip includes a peripheral circuit of a biometric sensor, an authentication information processing module, and a security module, and wherein the security module is overlapped with an active shield.

According to other embodiment of the present disclosure, a smart card includes an analog circuit configured to control a biometric sensor to generate a raw image, an authentication information processing module configured to pre-process the raw image and process the pre-processed raw image into fingerprint information for verification, and a security module configured to compare the fingerprint information for verification with registered fingerprint information and output an approval determination result for a payment request to a terminal, wherein the analog circuit, the authentication information processing module, and the security module are integrated into one chip.

The technical problems to be solved by the present disclosure are not limited to the above-mentioned technical problems and other technical problems which are not mentioned can be clearly understood by those skilled in the art from the following description.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Hereinafter, a smart card according to some example embodiments of the present disclosure will be described with reference to FIGS. 1 to 9.

Figure 1:
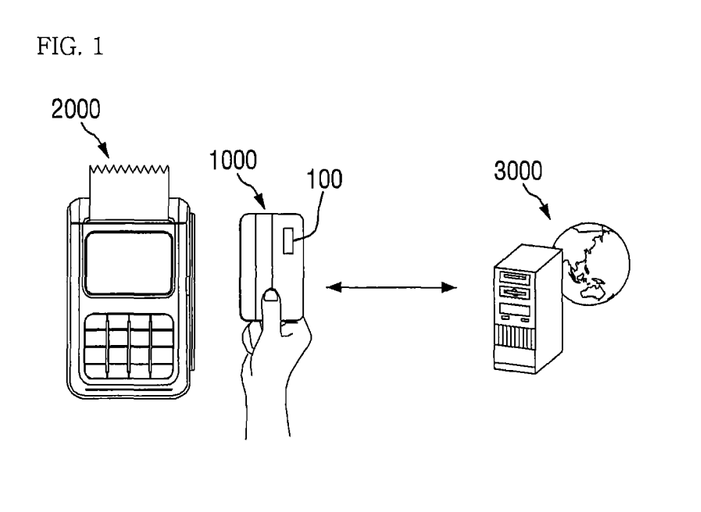
FIG. 1 illustrates a biometric authentication-based smart card payment system according to some example embodiments of the present disclosure.

FIG. 1 illustrates a biometric authentication-based smart card payment system according to some example embodiments of the present disclosure.

Referring to FIG. 1, according to some example embodiments, the payment system may include a biometric authentication smart card 1000, a payment terminal 2000, and a payment server 3000.

The smart card 1000 refers to a card in a form in which a semiconductor chip having various functions is inserted into and/or disposed on a plastic card (e.g., in a credit card form factor). According to some example embodiments, the smart card 1000 may be implemented in a contact manner that operates when an integrated chip 100 in the smart card 1000 is brought into contact with the payment terminal 2000, or may be implemented in a non-contact manner capable of exchanging data at a distance close to the integrated chip 100.

According to some example embodiments, when payment request information including deposit information is output from the online/offline payment terminal 2000 to the biometric authentication smart card 1000, the biometric authentication smart card 1000 outputs payment method information corresponding to the payment request information. The biometric authentication smart card 1000 will be described in detail with reference to FIGS. 2 to 6.

According to some example embodiments, the payment terminal 2000 may be a device for storing deposit information about the type, quantity, price, and the like of a product sold online/offline and managing sales information for each product. The payment terminal 2000 may be a point-of-sale (POS) terminal of a store in the case of offline, according to one example embodiment, may be an online shopping mall system in the case of online, according to another example embodiment, and may be a terminal device capable of accessing a smart card to read payment-related information and communicating with a payment server, according to still another example embodiment.

The payment terminal 2000 may be a device that is installed in an offline sales store and capable of reading product information from a barcode or the like attached to each product for sale using a reader or the like. According to some example embodiments, the product information may include information on the type of product, a product code, a sales price, and/or the like.

The payment terminal 2000 may transmit sales-related information to the payment server 3000. According to some example embodiments, the sales-related information may include at least one of sales price information, an identification (ID) of the payment terminal 2000, the time at which the payment terminal 2000 reads sales price information of the product, a type of work to be processed by the payment terminal 2000, domain information of a management server or the like of the payment terminal 2000, and/or deposit account information of a holder of the payment terminal 2000. As used herein, the term "and/or" includes any and all combinations of one or more of the associated listed items. Expressions such as "at least one of," when preceding a list of elements, modify the entire list of elements and do not modify the individual elements of the list.

Further, the payment terminal 2000 may transmit payment information read from the smart card 1000 to the payment server 3000. The payment information may include payment-level information and/or payment method information of a user registered in the smart card 1000.

According to some example embodiments, the payment method information may include payment account information and/or payment card information. According to some example embodiments, the payment account information is information related to a bank account of the user, and may include at least one of a bank account number, an account password, and a security-related authentication number. According to some example embodiments, the payment card information may include at least one piece of information of a card company that pays the cost, a card number, and/or a card password.

In addition, the payment terminal 2000 may check whether the user of the smart card 1000 read is a registered user based on biometric authentication information among the payment information read from the smart card 1000, and when the user of the smart card 1000 is the registered user, payment-level information of the user corresponding to a user index may be transmitted to the payment server 3000.

The payment server 3000 may determine whether to approve the payment on the basis of the sales-related information and/or the payment information received from the payment terminal 2000, and may transmit approval determination results to the payment terminal 2000.

According to some example embodiments, the payment server 3000 may determine whether to approve payment of the amount of money corresponding to the sales-related information on the basis of the payment information, that is, the payment method information and/or the payment-level information.

For example, in a case in which the payment information is the payment account information, the payment server 3000 may be a payment server of a financial institution (bank or the like) in which the user has opened a financial account. For example, in a case in which the payment information is the payment card information, the payment server 3000 may be a payment server of a financial institution in which the user has opened the payment card.

In the present specification, a normal user may be a user registered and stored in the payment server 3000, and may refer to a user who has a payment account with an amount of money greater than or equal to the amount of money requested for payment and/or has a payment card in which the amount of money requested for payment is within a usable limit range.

When it is determined that the card user is the normal user, the payment server 3000 may check the sales price information and the ID of the payment terminal 2000 from the sales-related information, compare the sales-related information with the payment information, and determine whether to approve the payment. This will be described in detail below.

Figure 2:
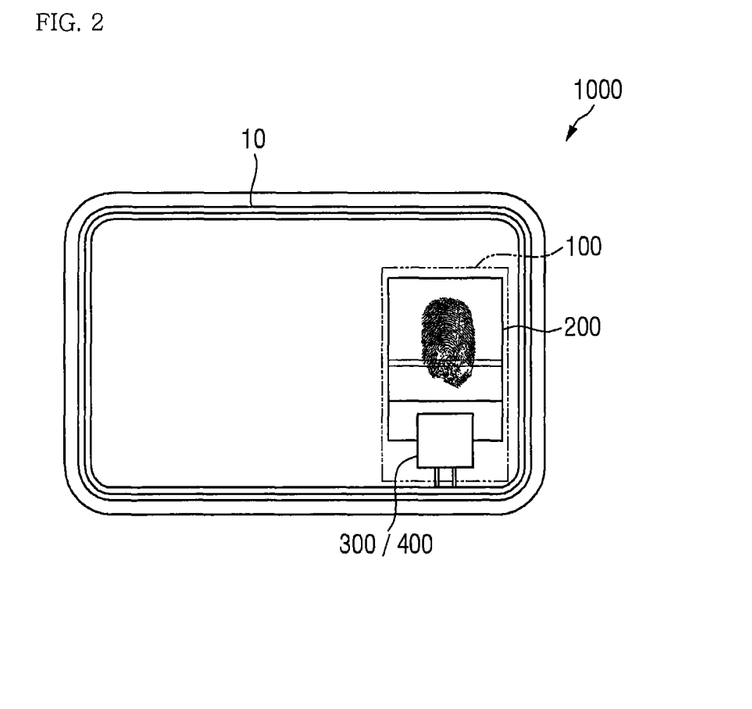
FIG. 2 is a schematic view illustrating the smart card based on biometric authentication according to some example embodiments of the present disclosure.
Figure 3:
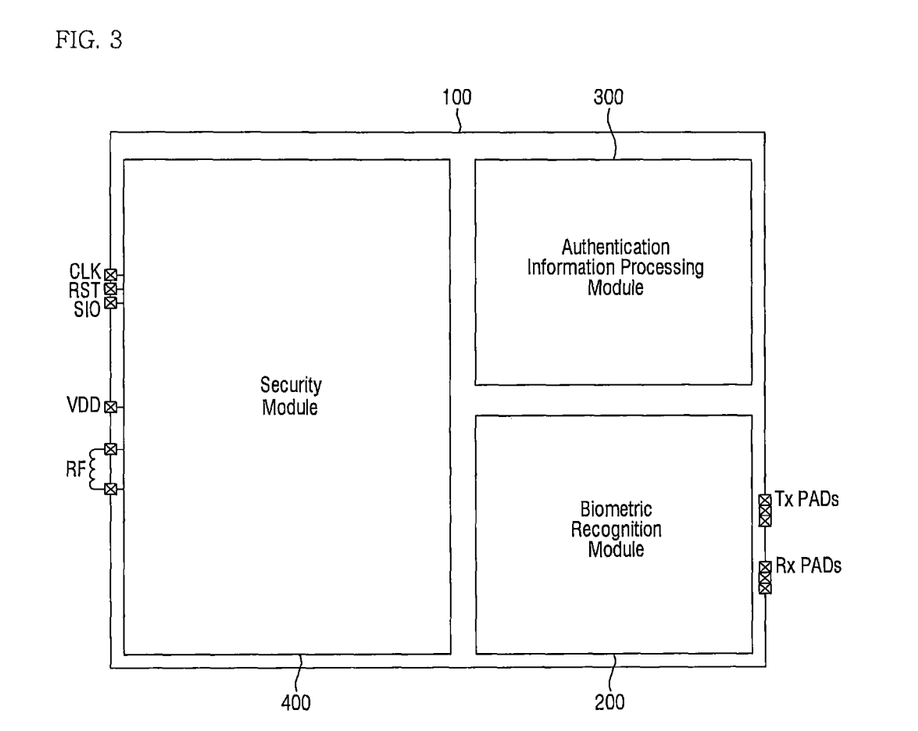
FIG. 3 is a schematic view illustrating a biometric authentication integrated chip according to some example embodiments of the present disclosure.

FIG. 2 is a schematic view illustrating the smart card based on biometric authentication according to some example embodiments of the present disclosure, and FIG. 3 is a schematic view illustrating a biometric authentication integrated chip according to some example embodiments of the present disclosure.

Referring to FIGS. 2 and 3, the biometric authentication smart card 1000 may include an antenna 10 and the integrated chip 100. The integrated chip 100 may include a biometric recognition module 200, an authentication information processing module 300, and a security module 400.

As used herein, the term "module" is intended to include an electronic structure that encompass software, hardware, or a combination of hardware and software. The functions of the module may be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts of the module, and thereby create means (functionality) and/or structure for implementing the functions/acts of the module. In some embodiments, the term "module" may be synonymous with "circuit."

The biometric recognition module 200 may be a device for enhancing the security of the smart card 1000. The biometric recognition module 200 may determine whether fingerprint information of an actual owner of the smart card 1000 (i.e., a previously registered user) matches fingerprint information of the card user, and when it is determined that the fingerprints match each other, the biometric recognition module 200 may release a lock of the security module 400 embedded in the smart card 1000 for a predetermined time by authenticating that the card user is the actual owner of the card. The biometric recognition module 200 may reduce and/or prevent illegal use of the smart card 1000 in advance by automatically turning off the release of the lock after the predetermined time.

The biometric recognition module 200 according to some example embodiments may be a sensor configured to sense a fingerprint or other type of biometric information (e.g., a biometric sensor), and may be a sensor configured to sense the fingerprint by, for example, a capacitive method, a piezoelectric method, or the like. The biometric recognition module 200 may be a swipe type sensor in which a finger swipes the sensor and thus a fingerprint is sensed and/or an area type sensor in which a finger touches the sensor for a predetermined time and thus a fingerprint is sensed.

The security module 400 according to some example embodiments may be an integrated circuit configured to record and/or store card identification information of the smart card 1000. The security module 400 may transmit the recorded card identification information to the payment terminal 2000 in a contact or non-contact manner, thereby performing the electronic payment.

The security module 400 according to some example embodiments may temporarily record the card identification information and modify or delete the recorded card identification information. The security module 400 may record card identification information on one piece of payment method information among a plurality of pieces of payment method information. Here, the card identification information is information corresponding to the payment method information, and includes information necessary for electronic payment such as, for example, card number information, card effective date information, card security information, and the like.

The security module 400 may comply with a high security requirement specification greater than or equal to evaluation assurance level (EAL)5. In order to satisfy the security requirement specification, the internal components in the security module 400 and data processed in the security module 400 may be encrypted based on a random key. For example, the security module 400 may encrypt and store the fingerprint information of the actual owner (previously registered user) of the card, and/or may prevent the fingerprint information from being exposed to the outside.

When the fingerprint information extracted from the biometric recognition module 200 is to be verified due to the use of the smart card 1000, the security module 400 may receive the registered fingerprint information from the authentication information processing module 300 and determine whether to approve the use of the smart card 1000 according to a matching result.

According to some example embodiments, the authentication information processing module 300 may process a raw image of the fingerprint received from the biometric recognition module 200 to generate a fingerprint template. The raw image may include a feature point of the fingerprint, that is, minutiae, which may be a detailed feature point such as a ridge end or bifurcation found in a fingerprint image. The authentication information processing module 300 may obtain template information of the corresponding fingerprint image, that is, fingerprint information for verification, through the detection of the minutiae. In some embodiments, the authentication information processing module 300 may include a microcontroller unit (MCU).

In some embodiments, the integrated chip 100 may include additional elements. For example, the integrated chip 100 may include components for sending/receiving radio frequency (RF) signals, a power supply VDD, input pins for one or more signals (e.g., CLK, RST, SIO), and/or one or more transmit TX or receive RX pads.

A peripheral circuit 220 (see FIG. 4) of the biometric recognition module 200, the authentication information processing module 300, and the security module 400 may be implemented as one integrated chip 100. That is, each of the components 200, 300, and 400 may be integrated into one chip. A detailed description of each of the components 200, 300, and 400 in the integrated chip 100 will be described in detail with reference to FIGS. 4 to 8.

Figure 4:
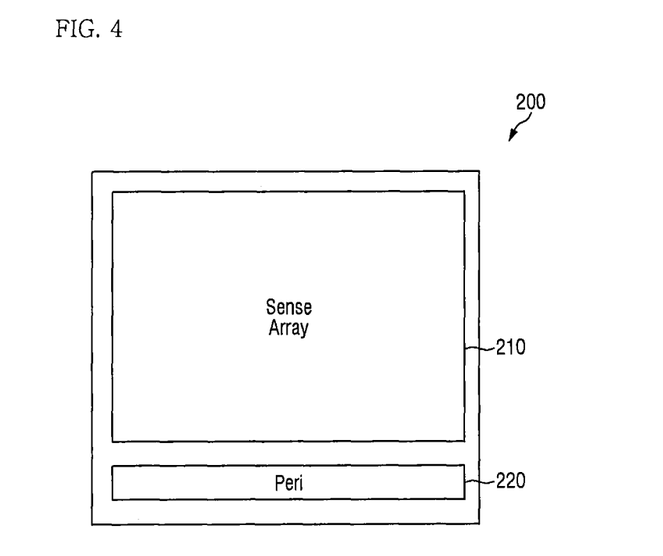
FIG. 4 is a schematic view illustrating the biometric recognition module according to some example embodiments of the present disclosure.

FIG. 4 is a schematic view illustrating the biometric recognition module according to some example embodiments of the present disclosure.

According to some example embodiments, the biometric recognition module 200 may include a sensing array 210 (illustrated as a sense array 210 in FIG. 4) configured to sense a fingerprint and the peripheral circuit 220 (illustrated as peri in FIG. 4) configured to control and/or drive the sensing array 210 and generate the sensed raw image.

In some embodiments, the sensing array 210 is or includes a biometric sensor. In some embodiments, the sensing array 210 is a unit that senses a touch of a finger and obtains a fingerprint image by scanning a fingerprint of the touching finger. The sensing array 210 may scan the fingerprint of a finger in various ways, such as, for example, a capacitive method, an optical method, a pressure method, a thermal detection method, or the like. According to an example embodiment, the sensing array 210 may also perform fingerprint sensing by mixing a swipe method and a touch method. For example, feature points of a fingerprint may be extracted after obtaining a fingerprint image using the swipe method when registering the fingerprint, and feature points of a fingerprint may be extracted after obtaining a fingerprint image using the touch method when authenticating the fingerprint, or vice versa.

The peripheral circuit 220 may perform signal processing on a fingerprint image frame scanned at a predetermined period (speed) by the sensing array 210. For example, the peripheral circuit 220 may include, for example, an analog circuit, a noise reduction circuit, a signal sensitivity amplification circuit, an analog-to-digital signal converter circuit, a digital circuit, and/or the like, which may convert the fingerprint image into an electrical signal. The peripheral circuit 220 may be implemented separately from or integrated with the sensing array 210 in the form of an application-specific integrated circuit (ASIC). The peripheral circuit 220 may output the raw image, upon which signal processing is performed, to the authentication information processing module 300.

Figure 5:
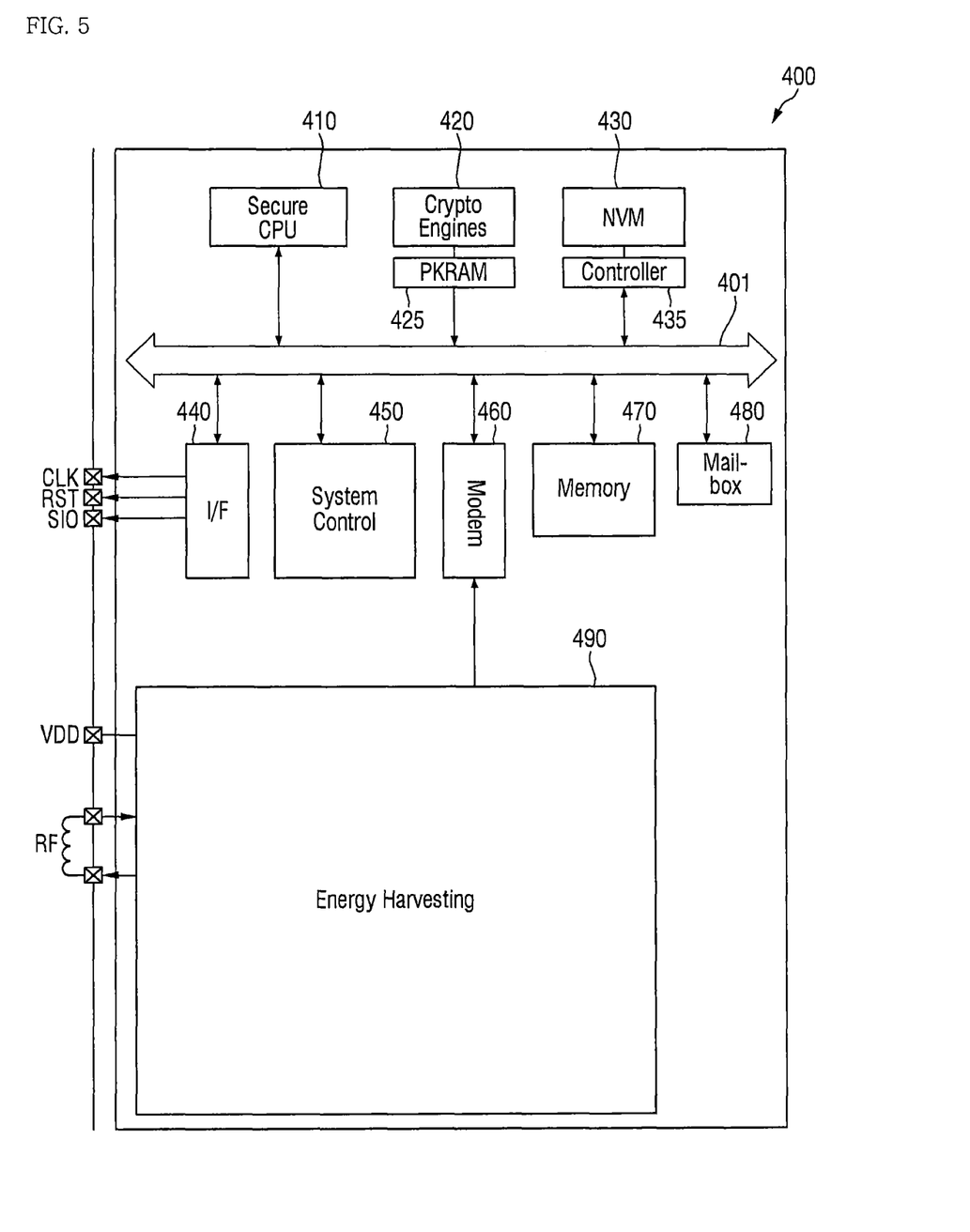
FIGS. 5 and 6 are schematic views illustrating the security module according to some example embodiments of the present disclosure.
Figure 6:
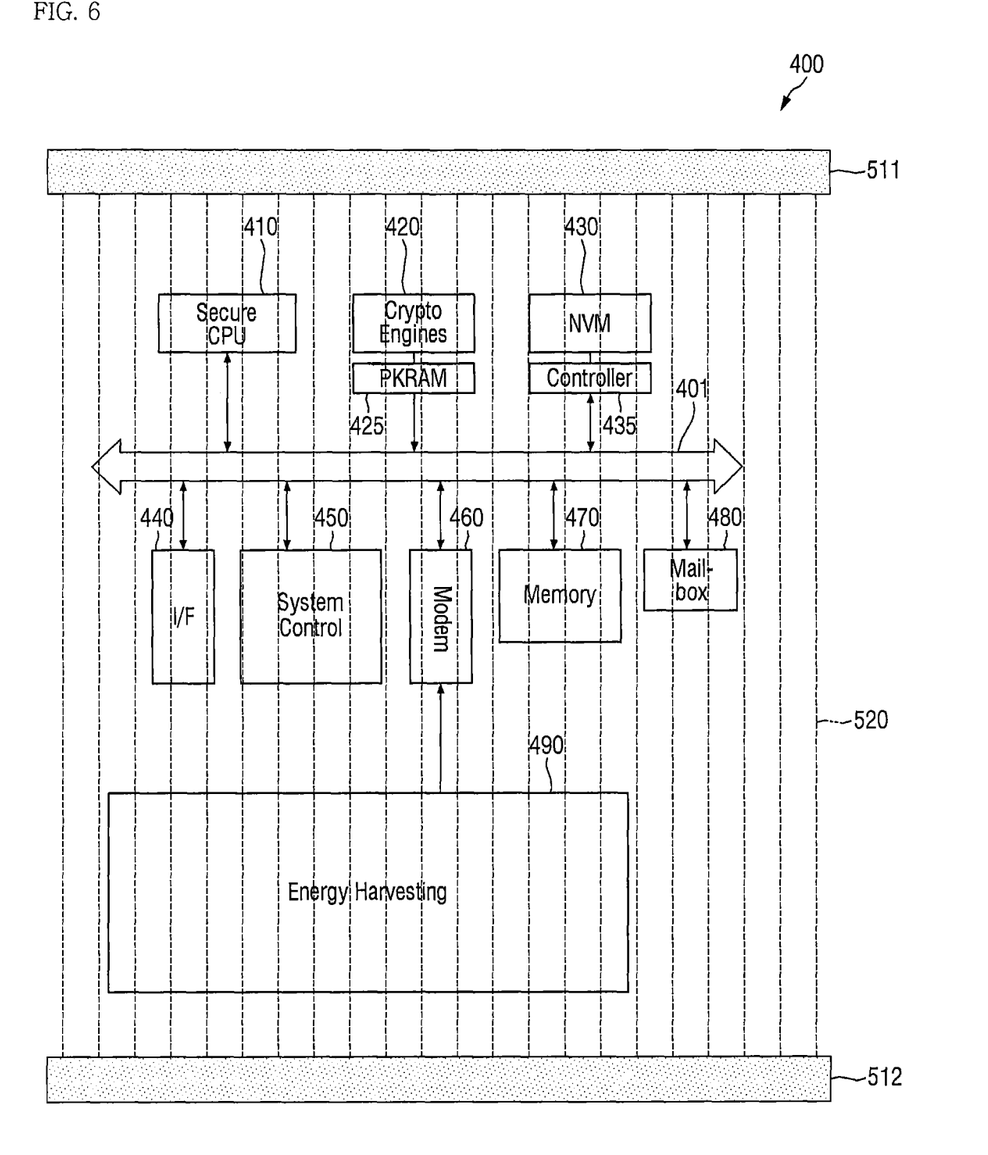

FIGS. 5 and 6 are schematic views illustrating the security module 400 according to some example embodiments of the present disclosure.

Referring to FIG. 5, the security module 400 may include a security central processing unit (CPU) 410, a crypto engine 420, a PKRAM 425, a non-volatile memory 430, a memory controller 435, an external interface 440, a system control unit 450, a modem 460, a memory 470, a mailbox 480, and an energy harvesting unit 490.

The components 410 to 490 may communicate with each other through a bus 401. For example, the bus 401 may be configured as an Advanced High-Performance Bus (AHB) interface.

According to some example embodiments, the security module 400 may include an active shield 520, which overlaps (e.g., vertically) each of the components 410 to 490, and side logics 511 and 512. It will be understood that "an element A vertically overlapping an element B" (or similar language) as used herein means that at least one vertical line intersecting both the elements A and B exists. According to some example embodiments, the active shield 520 is a unit in which signal lines extending in one direction in a plan view (a first direction) are arranged in parallel at regular intervals using a top metal of a layout of the security module 400. As one example, the active shield 520 may include a plurality of top metal lines spaced apart from each other in parallel at an interval of 1 µm. The side logics 511 and 512 may be disposed at opposite ends of the active shield 520 and may extend in a second direction perpendicular to the first direction and may be electrically connected to the signal lines of the active shield 520. The side logics 511 and 512 may apply a predetermined signal to the active shield 520 to prevent and/or reduce detection from the outside by reverse engineering or probing.

The security CPU 410 may control overall operations related to the security of the security module 400. For example, the security CPU 410 may determine whether the registered fingerprint information matches the fingerprint information for verification, and determine whether to approve the use of the request payment according to the determination result.

The crypto engine 420 may encrypt and/or decrypt data to be transmitted to or received from the outside of the security module 400. For example, the crypto engine 420 may perform a private key encryption/decryption operation based on Advanced Encryption Standard (AES), Data Encryption Standard (DES), Secure Hash Algorithm (SHA), or the like. The crypto engine 420 may include a big number multiplier (e.g., TORNADO™) used for detecting errors of the encrypted data and/or decrypted data, for example, calculating Rivest-Shamir-Adleman (RSA), Elliptic Curve Cryptography (ECC), or the like.

The PKRAM 425 is a memory connected to the crypto engine 420 and may store a public key, and the crypto engine 420 may perform encryption/decryption of data using the public key and the private key.

The non-volatile memory 430 may be controlled and/or driven through the memory controller 435. The non-volatile memory 430 may store codes used for the security CPU 410 to operate, initial data, the fingerprint information of the registered actual user, and the like. Data read and/or output from the non-volatile memory 430 may further include an error correction code (ECC) bit corresponding to the stored data. The memory controller 435 may detect an error by checking the ECC bit of the read data and correct the detected error.

The external interface 440 may receive a command from a host device (e.g., the payment terminal 2000), or transmit data resulting from the command processing to the host device. The external interface 440 may include a plurality of pins, for example, a clock signal pin CLK, a reset signal pin RST, and/or a data pin SIO. The external interface may be in contact with and communicate with the host device according to, for example, the ISO7816 standard.

The modem 460 may receive a command from a host device (e.g., the payment terminal 2000), or transmit data resulting from the command processing to the host device. Unlike the external interface 440, the modem 460 may communicate with the host device in a non-contact manner according to the ISO14443 standard. The modem 460 may be connected to the energy harvesting unit 490. The energy harvesting unit 490 may be connected to a radio-frequency (RF) pin connected to the antenna 10. The energy harvesting unit 490 may receive an RF signal through the antenna 10 and generate power using the received RF signal. The modem 460 may supply the generated power to the security module 400 to control and/or drive the smart card 1000.

The system control unit 450 may perform a system control operation such as controlling a clock of the smart card 1000, controlling a driving reset of the smart card 1000, and/or controlling a power supply.

The memory 470 may be a working memory that stores data generated while the security module 400 operates. The memory 470 may be, for example, a volatile memory such as a random access memory (RAM).

The mailbox 480 communicates with the authentication information processing module 300. As used herein, the term "mailbox" refers to an electronic structure and/or circuit that may be implemented in hardware and/or software. In some embodiments, the mailbox 480 may facilitate the transmission/reception of messages (e.g., electronic messages). A detailed description will be given with reference to FIG. 8.

Figure 7:
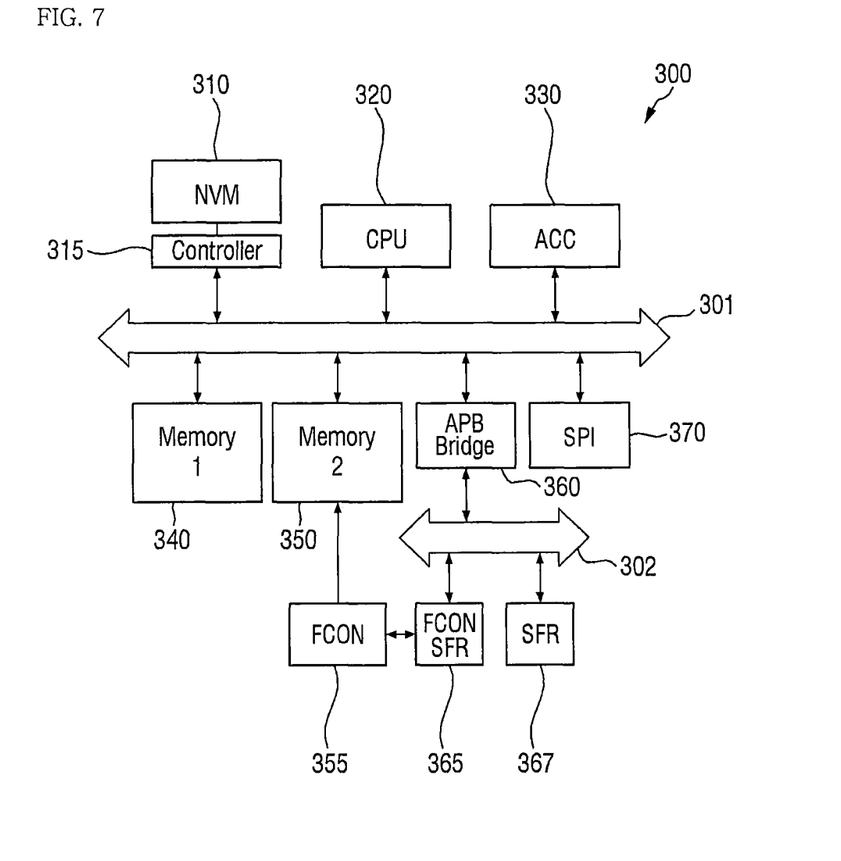
FIG. 7 is a schematic view illustrating the authentication information processing module according to some example embodiments of the present disclosure.

FIG. 7 is a schematic view illustrating the authentication information processing module according to some example embodiments of the present disclosure.

When the authentication information processing module 300 receives a command from the security module 400, the authentication information processing module 300 may enable the biometric recognition module 200 and receive a raw image of the sensed fingerprint from the biometric recognition module 200. The authentication information processing module 300 may extract feature points from the raw image and generate fingerprint information for verification, and transmit the fingerprint information for verification to the security module 400.

According to some example embodiments, the authentication information processing module 300 satisfies a security requirement specification of about EAL2. In some embodiments, the authentication information processing module 300 may operate at a high frequency to extract fingerprint information from the raw image within several milliseconds. In some embodiments, the authentication information processing module 300 may use the top metal lines as signal lines and/or power supply lines. That is, unlike in FIG. 6, the authentication information processing module 300 may not include an active shield and side logics.

Referring to FIG. 7, the authentication information processing module 300 according to some example embodiments may include a non-volatile memory 310, a memory controller 315, a CPU 320, an accelerator 330, a first memory 340, a second memory 350, a serial peripheral interface (SPI) interface 370, and/or an Advanced Peripheral Bus (APB) bridge 360.

The components 310 to 370 may communicate with each other through a bus 301. For example, the bus 301 may be configured as an AHB interface.

The non-volatile memory 310 may be controlled and/or driven and/or controlled through the memory controller 315. The non-volatile memory 310 may store code used for the CPU 320 to operate, initial data, and/or the like. Data read and output from the non-volatile memory 310 may further include an ECC bit corresponding to the stored data. The memory controller 315 may detect an error by checking the ECC bit of the read data and correct the detected error.

The CPU 320 may control overall operations of the authentication information processing module 300. In addition, the CPU 320 may process a raw image into fingerprint information, encrypt the processed fingerprint information, and/or transmit the encrypted fingerprint information to the security module 400 through the bus 301. For example, the CPU 320 may encrypt the processed fingerprint information using an AES method.

The accelerator 330 may perform complex calculations during image processing of the raw image. For example, the accelerator 330 may input the raw image to a convolutional neural network (CNN) to perform anti-spoofing calculations on the image. The accelerator 330 may include an adder and/or a multiplier for CNN calculations.

The first memory 340 may be a working memory, and may store an intermediate value or a resultant value of the accelerator 330 as one example, and/or may store data required by the CPU 320 as another example.

The authentication information processing module 300 may further include a sensor controller 355, and spatial frequency response (SFR) units 365 and 367.

The sensor controller 355 may enable the biometric recognition module 200, and/or control the peripheral circuit 220 to receive a raw image.

The SFR units 365 and 367 may be connected to the APB bridge 360 through a bus 302. For example, the bus 302 may be implemented as an APB interface. The APB bridge 360 may convert APB data into AHB data and/or convert AHB data into APB data.

The sensor controller 355 may control the SFR unit 367 through the SFR unit 365. The SFR unit 367 may preprocess a raw image so that the CPU 320 and/or the accelerator 330 processes the raw image. The SFR unit 367 may adjust the sharpness of the received raw image based on, for example, an SFR algorithm.

The sensor controller 355 may store data, which is obtained by processing the raw image received from the biometric recognition module 200 by the SFR unit 367, the accelerator 330, and/or the CPU 320, in the second memory 350. The second memory 350 may store the data in units that may be processed by the CPU 320 and/or the accelerator 330.

The first memory 340 and the second memory 350 may be volatile memory devices such as, for example, dynamic random access memories (DRAMs), static random access memories (SRAMs), or the like.

The authentication information processing module 300 may further include the serial peripheral interface (SPI) interface 370. The SPI interface 370 may be an interface for connecting to an external device, and may transmit and/or receive SPI signals (e.g., SCLK, CS, MOSI, MISO, and the like) to and from the external device. For example, the SPI interface 370 may be connected to an extended external fingerprint sensor.

Figure 8:
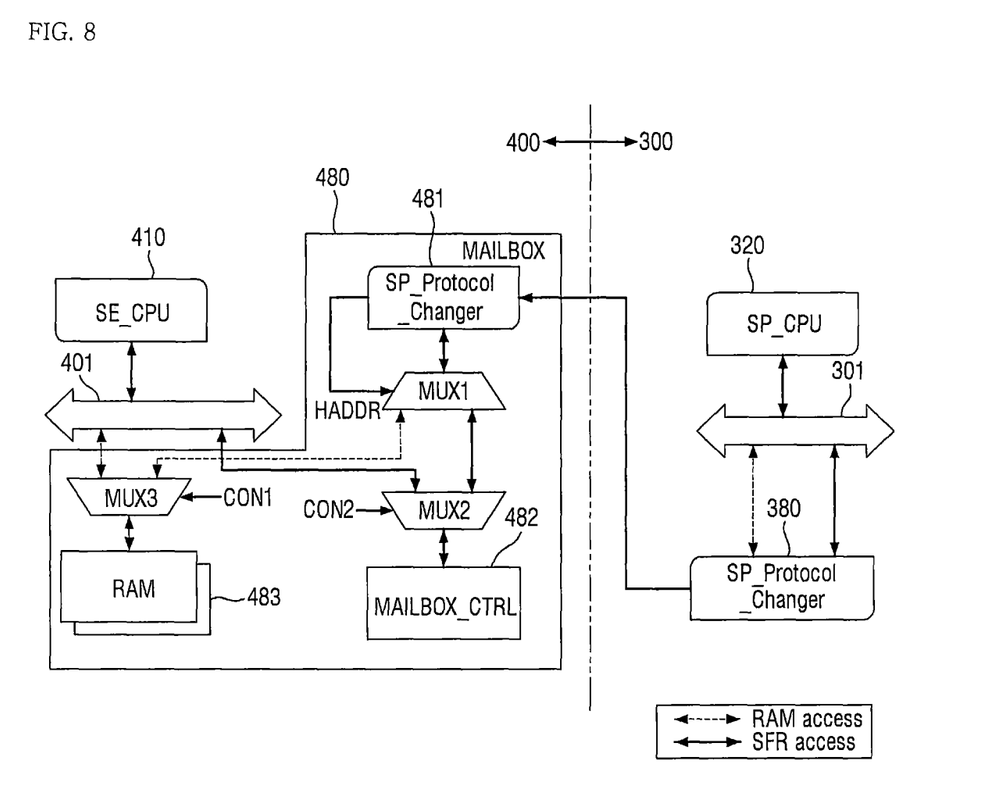
FIG. 8 is a diagram illustrating an interface between the security module and the authentication information processing module according to some example embodiments of the present disclosure in more detail.

FIG. 8 is a diagram illustrating an interface between the security module and the authentication information processing module according to some example embodiments of the present disclosure in more detail.

Referring to FIGS. 5, 6, and 8, the security module 400 may meet a security requirement specification greater than or equal to EAL5. Data of the bus 401 and the memories 430 and 470 (see FIG. 5) in the security module 400 may be encrypted by the security CPU 410 based on a random key. The fingerprint information of the registered actual user maybe encrypted and stored in the non-volatile memory 430 and thus is prevented from being exposed to the outside.

Thereafter, when authentication is required for the fingerprint information for verification, the security module 400 may determine whether the fingerprint information for verification received through the mailbox 480 matches the registered fingerprint information stored in the non-volatile memory 430 and determines whether to make the final approval.

The mailbox 480 may include a protocol changer 481, a mailbox controller 482, a memory 483, and a plurality of multiplexers (MUXs) MUX1, MUX2, and MUX3. In some embodiments, the plurality of multiplexers (MUXs) MUX1, MUX2, and MUX3 may be controlled by control signals CON1, CON2.

The authentication information processing module 300 may further include a protocol changer 380 as an interface.

The protocol changer 380 may send an AHB signal used for the authentication information processing module 300 to communicate with the mailbox 480 to the protocol changer 481. The protocol changer 481 may activate and/or wake up the plurality of MUXs MUX1, MUX2, MUX3 and the security CPU 410 so that the security module 400 performs an authentication operation on the basis of the received AHB signal.

The mailbox controller 482 may store usage status information and/or data size information. The mailbox controller 482 may include, for example, a status register and/or a size register, and may store the usage status information in the status register and/or the data size information in the size register. The usage status information may be information indicating whether the mailbox 480 is used by the authentication information processing module 300, that is, a communication state with the authentication information processing module 300. The data size information may be size information of data transmitted to and/or received from the authentication information processing module 300.

The memory 483 may temporarily store data transmitted to and/or received from the authentication information processing module 300. The memory 483 may be a volatile memory, for example, a DRAM, an SRAM, or the like.

The security module 400 may check a communication state with the authentication information processing module 300 through the mailbox controller 482. When not in use, that is, when the authentication information processing module 300 does not use the mailbox 480 (that is, the mailbox is empty), the mailbox 480 may check a size of data to be transmitted, may write size information to the size register of the mailbox controller 482, may store the data in the memory 483, and may convert the usage status information from the empty state to a transmission ready state.

When the mailbox 480 confirms the transmission ready state, the mailbox 480 may activate and/or wake up the authentication information processing module 300, and the mailbox 480 may enter a stand-by state. The authentication information processing module 300 may read the fingerprint information stored in the second memory 350 and transmit the read fingerprint information to the mailbox 480.

The mailbox 480 may store the read fingerprint information in the memory 483. The security CPU 410 may transmit the fingerprint information stored in the memory 483 to the crypto engine 420.

Figure 9:
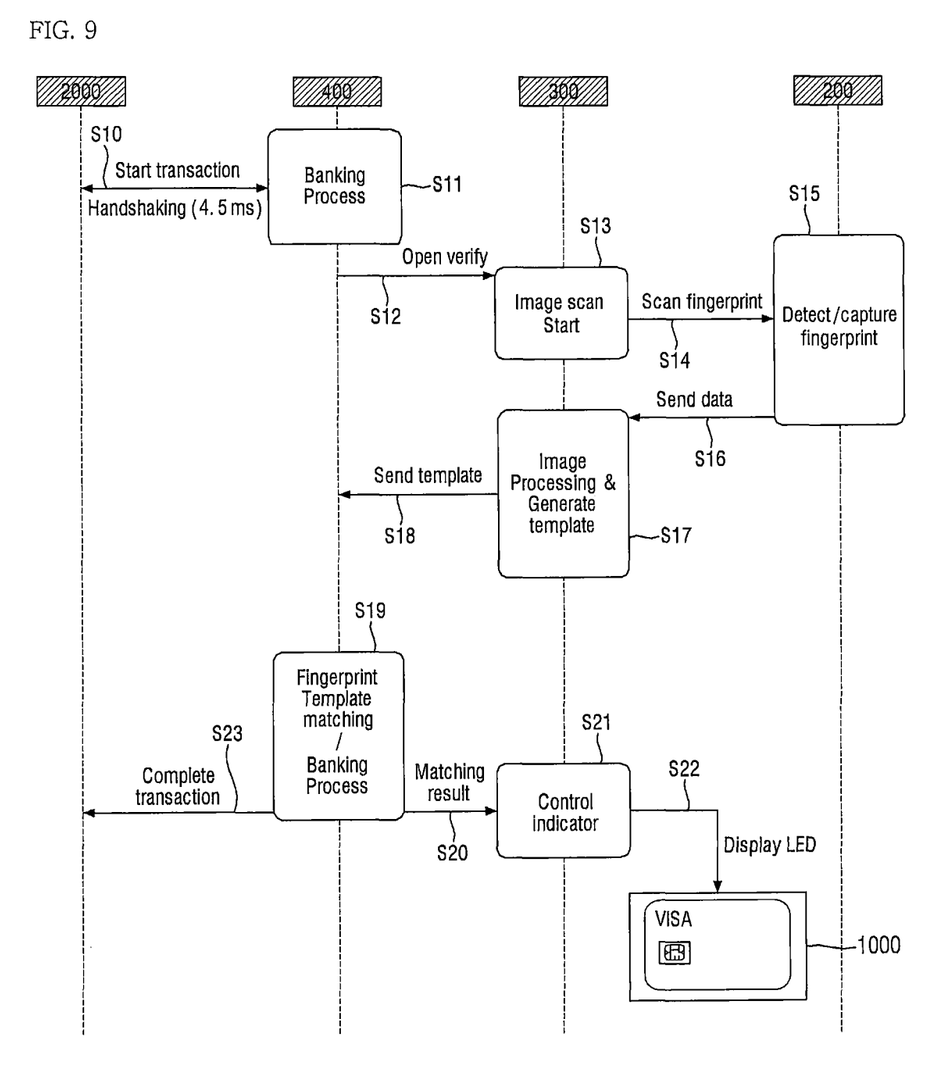
FIG. 9 is a flowchart for describing a method of operating a smart card according to some example embodiments of the present disclosure.

FIG. 9 is a flowchart for describing a method of operating a smart card according to some example embodiments of the present disclosure.

Referring to FIG. 9, when communication with a payment terminal 2000 starts (S10), first, the smart card 1000 receives payment request information from the payment terminal 2000 (S11). A security module 400 may activate and/or wake up an authentication information processing module 300 according to the payment request information and instructs the authentication information processing module 300 to sense biometric information (S12). The authentication information processing module 300 enables the biometric recognition module 200 and allows the biometric recognition module 200 to sense and/or scan a fingerprint (S13 and S14). The biometric recognition module 200 confirms whether a finger of a card user is detected, and when the finger is detected, the biometric recognition module 200 senses and/or scans the fingerprint (S15), and transmits a raw image (S16). The authentication information processing module 300 pre-processes the raw image, and then generates fingerprint information for verification including a template and the like through a CPU and an accelerator (S17). The fingerprint information for verification is transmitted to the security module 400 (S18), and the security module 400 determines whether the registered fingerprint information matches the fingerprint information for verification and determines whether the card user is the same as a registered user (S19). When it is determined that the card user is the same as the registered user, usage approval notification for the payment request information is transmitted to the payment terminal, and when it is determined that the card user is not the same as the registered user, usage disapproval notification for the payment request information is transmitted to the payment terminal (S23). The usage approval/disapproval notification may also be displayed by lighting light-emitting diodes (LEDs) (e.g., on the smart card 1000) or the like through an indicator controller (S20 to S22).

While the example embodiments of the present disclosure have been described with reference to the accompanying drawings, it should be understood by those skilled in the art that various modifications may be made without departing from the scope of the present disclosure and without changing essential features thereof. Therefore, the above-described example embodiments should be understood to be examples and not limiting.

What is claimed is:

1. A smart card, comprising:
   a peripheral circuit configured to control a fingerprint sensing array and generate a raw image;
   an authentication information processing module configured to process the raw image into fingerprint information for verification;
   a security module configured to determine whether the fingerprint information for verification matches registered fingerprint information stored in the security module to determine usage approval or disapproval for a payment request; and
   an active shield overlapping the security module and configured to prevent detection from outside, the active shield comprising a plurality of signal lines extending in a first direction in a plan view and spaced apart from each other at predetermined intervals to be parallel to each other,
   wherein the peripheral circuit, the authentication information processing module, and the security module are integrated into one chip, and
   wherein the security module is configured to release a lock of the security module for a prescribed time when the fingerprint information for verification matches the registered fingerprint information and to automatically turn off the release of the lock of the security module after the prescribed time has elapsed,
   wherein the security module includes a mailbox that is below the active shield and configured to communicate with the authentication information processing module,
   wherein the mailbox stores usage status information and data size information, which indicate a communication state between the security module and the authentication information processing module.

2. The smart card of claim 1,
   wherein the security module comprises a first side logic and a second side logic that extend in a second direction perpendicular to the first direction in the plan view, the first side logic and second side logic intersecting ends of each of the plurality of signal lines to be electrically connected thereto.

3. The smart card of claim 2, wherein the security module further comprises:
   a first non-volatile memory configured to store the registered fingerprint information; and
   a security central processing unit (CPU) configured to compare the fingerprint information for verification with the registered fingerprint information and determine the usage approval or disapproval according to a comparison result, and
   wherein the first non-volatile memory and the security CPU are below the active shield.

4. The smart card of claim 2, wherein the security module further comprises:
   a crypto engine configured to encrypt and/or decrypt data transmitted to and/or received from outside of the security module; and
   a first memory configured to store the encrypted data and/or the decrypted data, and
   wherein the first memory and the crypto engine are below the active shield.

5. The smart card of claim 1, wherein the mailbox is further configured to:
   check a size of data to be transmitted and enter a transmission ready state;
   activate the authentication information processing module so that the security module enters a stand-by state; and
   receive the fingerprint information for verification from the authentication information processing module.

6. The smart card of claim 1, wherein the authentication information processing module comprises:
   a second memory configured to receive and store the raw image;
   an accelerator configured to perform a convolutional neural network (CNN) calculation on the raw image;
   a third memory configured to store an intermediate value and/or a resultant value of the CNN calculation; and
   a central processing unit (CPU) configured to process the raw image into the registered fingerprint information based on the resultant value.

7. The smart card of claim 6, wherein the authentication information processing module further comprises a spatial frequency response (SFR) unit configured to pre-process the raw image and store the pre-processed raw image in the second memory.

8. The smart card of claim 6, wherein the authentication information processing module further comprises a serial peripheral interface (SPI) interface that is configured to connect to an external device.

9. A smart card based on biometric authentication comprising a single chip,
wherein the single chip comprises:
a peripheral circuit of a biometric sensor;
an authentication information processing module configured to process biometric information relating to a user of the smart card obtained from the biometric sensor; and
a security module configured to compare the biometric information obtained from the biometric sensor with reference biometric information relating to a registered user that is stored in a first memory of the security module to determine whether the user of the smart card is a registered user,
wherein at least the security module is overlapped with an active shield which is configured to prevent detection from outside, the active shield comprising a plurality of signal lines extending in a first direction in a plan view and spaced apart from each other at predetermined intervals to be parallel to each other, and
wherein the security module is configured to encrypt the reference biometric information prior to storing the reference biometric information in the first memory,
wherein the security module includes a mailbox that is below the active shield and configured to communicate with the authentication information processing module, and
wherein the mailbox stores usage status information and data size information, which indicate a communication state between the security module and the authentication information processing module.

10. The smart card of claim 9, wherein the security module comprises:
the active shield comprising a plurality of signal lines extending in a first direction and spaced apart from each other at predetermined intervals to be parallel to each other; and
a first side logic and a second side logic that extend in a second direction perpendicular to the first direction and intersect opposite ends of each of the plurality of signal lines to be electrically connected thereto.

11. The smart card of claim 9, wherein the peripheral circuit is configured to control the biometric sensor to generate a raw image,
wherein the authentication information processing module is configured to process the raw image into fingerprint information for verification, and
wherein the security module is configured to determine whether registered fingerprint information matches the fingerprint information for verification and output usage approval or disapproval according to a determination result to a terminal.

12. The smart card of claim 11, wherein the security module comprises:
a crypto engine configured to encrypt and/or decrypt data transmitted to and/or received from the security module; and a second memory configured to store the encrypted data and/or the decrypted data.

13. The smart card of claim 9, wherein the mailbox is further configured to:
check a size of data to be transmitted;
enter a transmission ready state;
activate the authentication information processing module so that the security module enters a stand-by state; and
receive the fingerprint information for verification from the authentication information processing module.

14. The smart card of claim 13, wherein the crypto engine is further configured to encrypt the fingerprint information for verification, and
wherein the security module is further configured to determine whether the encrypted fingerprint information for verification matches the registered fingerprint information.

15. The smart card of claim 11, wherein the authentication information processing module comprises:
a second memory configured to receive and store the raw image;
an accelerator configured to perform a convolutional neural network (CNN) calculation on the raw image;
a third memory configured to store an intermediate value and/or a resultant value of the CNN calculation; and
a central processing unit (CPU) configured to process the raw image into the registered fingerprint information based on the resultant value.

16. The smart card of claim 9, wherein the authentication information processing module comprises a serial peripheral interface (SPI) that is configured to connect to an external device.

17. A smart card comprising:
an analog circuit configured to control a biometric sensor to generate a raw image;
an authentication information processing module configured to pre-process the raw image and process the pre-processed raw image into fingerprint information for verification;
a security module configured to compare the fingerprint information for verification with registered fingerprint information and output an approval determination result for a payment request to a terminal;
an energy harvesting module configured to receive a radio frequency (RF) signal and to generate power using the received RF signal for driving the smart card; and
an active shield comprising a plurality of signal lines overlapping the security module that extend in a first direction in a plan view and spaced apart from each other at predetermined intervals to be parallel to each other,
wherein the analog circuit, the authentication information processing module, the energy harvesting module, and the security module are integrated into one chip,
wherein the security module includes a mailbox configured to communicate with the authentication information processing module, and
wherein the mailbox stores usage status information and data size information, which indicate a communication state between the security module and the authentication information processing module.

18. The smart card of claim 17, wherein the security module comprises:
a first side logic and a second side logic that extend in a second direction perpendicular to the first direction in the plan view and respectively intersect opposite ends of each of the plurality of signal lines to be electrically connected thereto.

19. The smart card of claim 17, wherein the authentication information processing module and the security module each comprise a protocol changer configured to transmit and receive an Advanced High-Performance Bus (AHB) signal to and from each other, and wherein the security module comprises:

the mailbox configured to be activated according to the AHB signal;

a crypto engine configured to encrypt the fingerprint information for verification received by the mailbox; and a security central processing unit (CPU) configured to compare the encrypted fingerprint information for verification with the registered fingerprint information and output the approval determination result.

* * * * *